(12) United States Patent
Bonanno et al.

(10) Patent No.: US 11,663,126 B1
(45) Date of Patent: May 30, 2023

(54) RETURN ADDRESS TABLE BRANCH PREDICTOR

(71) Applicant: International Business Machines Corporation, Armonk, NY (US)

(72) Inventors: James Bonanno, Liberty Hill, TX (US); Brian Robert Prasky, Campbell Hall, NY (US); Adam Benjamin Collura, Hopewell Junction, NY (US); Edward Thomas Malley, Eastchester, NY (US); James Raymond Cuffney, Poughkeepsie, NY (US); Dominic Ditomaso, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/678,179

(22) Filed: Feb. 23, 2022

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | | |
|---|---|---|---|
| 5,974,543 A | 10/1999 | Hilgendorf et al. | |
| 6,289,444 B1 | 9/2001 | Nair | |
| 7,082,520 B2 | 7/2006 | Bonanno et al. | |
| 9,298,465 B2 | 3/2016 | Bonanno et al. | |
| 10,650,141 B2 | 5/2020 | Loman et al. | |
| 11,099,849 B2 | 8/2021 | Chou et al. | |
| 2011/0314259 A1 | 12/2011 | Ekanadham et al. | |
| 2017/0344373 A1 | 11/2017 | Bonanno et al. | |
| 2018/0246718 A1* | 8/2018 | Lin | G06F 12/0875 |

(Continued)

OTHER PUBLICATIONS

Anonymous, "Address Mode Aware Branch Prediction With Shutdown Capability," Mar. 27, 2014, An IP.com Prior Art Database Technical Disclosure, IP.com No. IPCOM000235852D, 5 pages.

(Continued)

*Primary Examiner* — Jae U Yu
(74) *Attorney, Agent, or Firm* — Cantor Colburn LLP; Brian Restauro

(57) ABSTRACT

Embodiments include storing return addresses for a branch-target-buffer. Aspects include receiving a first instruction and based on a determination that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction. Aspects also include receiving a second instruction and based on a determination that the second instruction is predicted to be a return instruction with a predicted return address table index value from the branch-target-buffer, using the index value to select the return address to predict as the target address.

20 Claims, 10 Drawing Sheets

(56) References Cited

U.S. PATENT DOCUMENTS

2020/0264887 A1    8/2020   Collura et al.

OTHER PUBLICATIONS

Anonymous, "Multiple Absolute Address History Tables Combined with Branch Target Buffer (BTB) Absolute Address Predition," May 5, 2011, An IP.com Prior Art Database Technical Disclosure, IP.com No. PCOM000206764D, 6 pages.
Anonymous, "System and Method for Recovering Global Branch Prediction Information Using Address Offset Information," Apr. 25, 2012, An IP.com Prior Art Database Technical Disclosure, IP.com No. IPCOM000216961D, 4 pages.
Seznee, A. et al., "Design Tradeoffs for the Alpha EV8 Conditional Branch Predictor" ACM SIGARCH Computer Architecture News (1999): 12 pages.
Wang et al., "ReRanz: A Light-Weight irtual Machine to Mitigate Memory Disclosure Attacks" SIGPLAN Not. 52, 7 (2017): pp. 143-156.

* cited by examiner

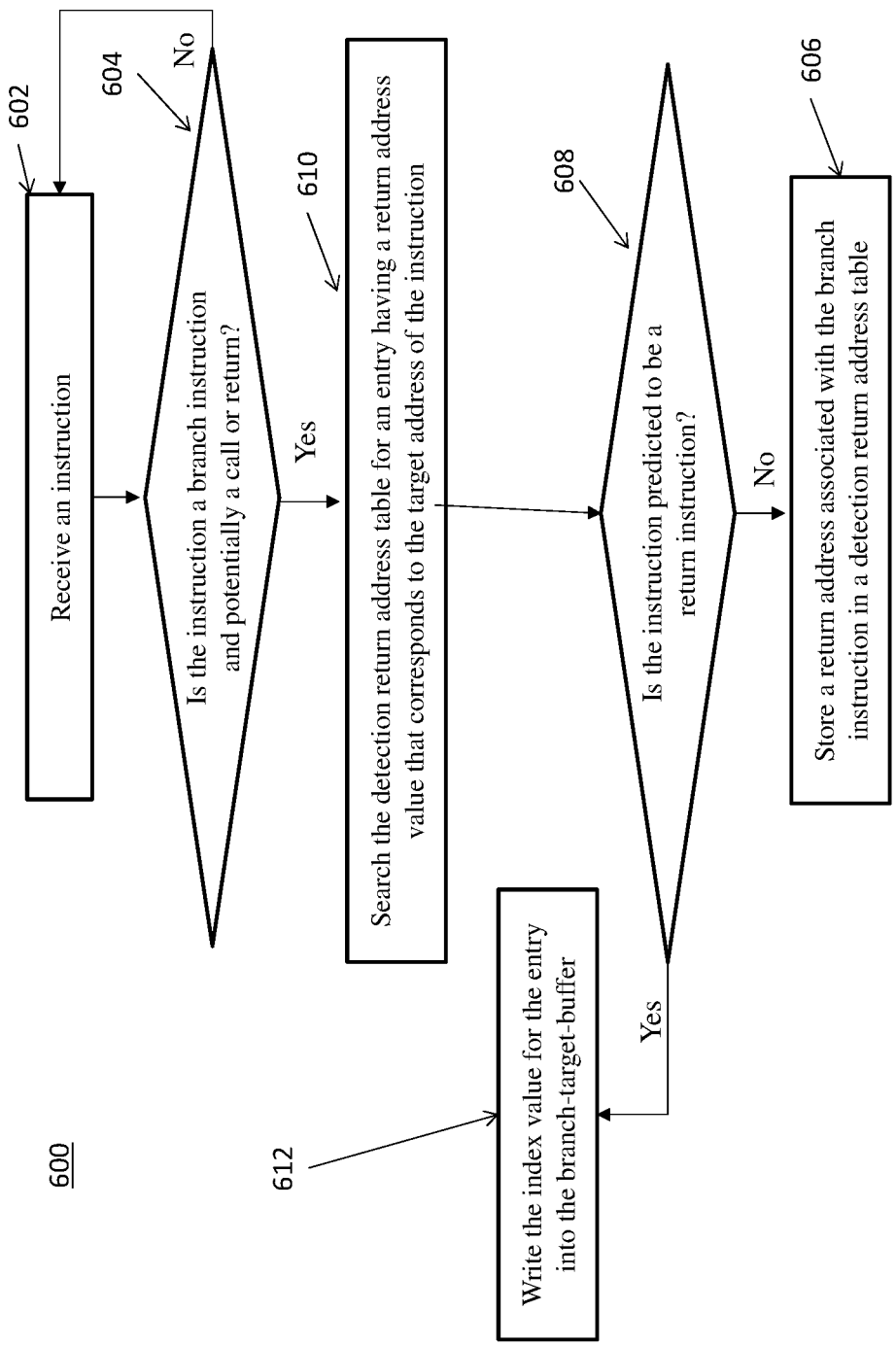

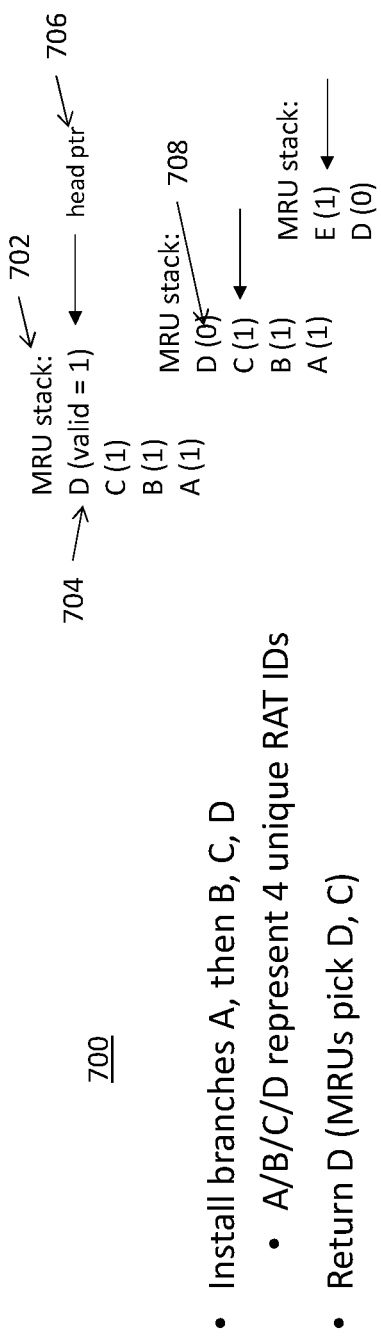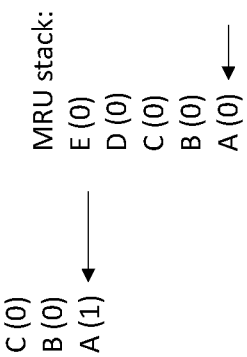
FIG. 7A
FIG. 7B

RETURN ADDRESS TABLE BRANCH PREDICTOR

BACKGROUND

The present disclosure relates to computer processing systems, and more specifically, to methods, systems, and computer program products for predicting target addresses of return branches.

An instruction pipeline in a computer processor improves instruction execution throughput by processing instructions using several pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching the next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset from the branch address or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction.

During traditional branch target prediction, when call branches are identified, a return address stack is used to store the return addresses associated with the call addresses, where the return address stack is a last-in-first-out (LIFO) memory structure. Due to the LIFO nature of the return address stack, recovery from a misprediction is difficult.

SUMMARY

Embodiments of the present invention are directed to a computer-implemented method for storing return addresses for a branch-target-buffer. The method includes receiving, by a branch prediction module, a first instruction and based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored. The method also includes receiving, by the branch prediction module, a second instruction and based on a determination, by the branch prediction module, that the second instruction is predicted to be a return instruction with a predicted return address table index value from the branch-target-buffer, using the index value to select the return address to predict as the target address.

Embodiments of the present invention are directed to a system having a memory having computer readable instructions and one or more processors for executing the computer readable instructions, the computer readable instructions controlling the one or more processors to perform operations. The operations include receiving, by a branch prediction module, a first instruction and based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored. The operations also include receiving, by the branch prediction module, a second instruction and based on a determination, by the branch prediction module, that the second instruction is predicted to be a return instruction with a predicted return address table index value from the branch-target-buffer, using the index value to select the return address to predict as the target address.

Embodiments of the present invention are directed to a computer program product that includes a tangible storage medium readable by a processing circuit and storing instructions for execution by the processing circuit for performing a method. The method receiving, by a branch prediction module, a first instruction and based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored. The method also includes receiving, by the branch prediction module, a second instruction and based on a determination, by the branch prediction module, that the second instruction is predicted to be a return instruction with a predicted return address table index value from the branch-target-buffer, using the index value to select the return address to predict as the target address.

Other embodiments of the present invention implement features of the above-described apparatus as a method of configuring the apparatus.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 is a flowchart diagram illustrating a method for storing return addresses in a detection branch-target-buffer in accordance with an exemplary embodiment;

FIG. 7A is a code sequence in accordance with an exemplary embodiment;

FIG. 7B is a block diagram illustrating a most recently used stack created based on the code sequence shown in FIG. 7B in accordance with an exemplary embodiment.

DETAILED DESCRIPTION

Figure 1:
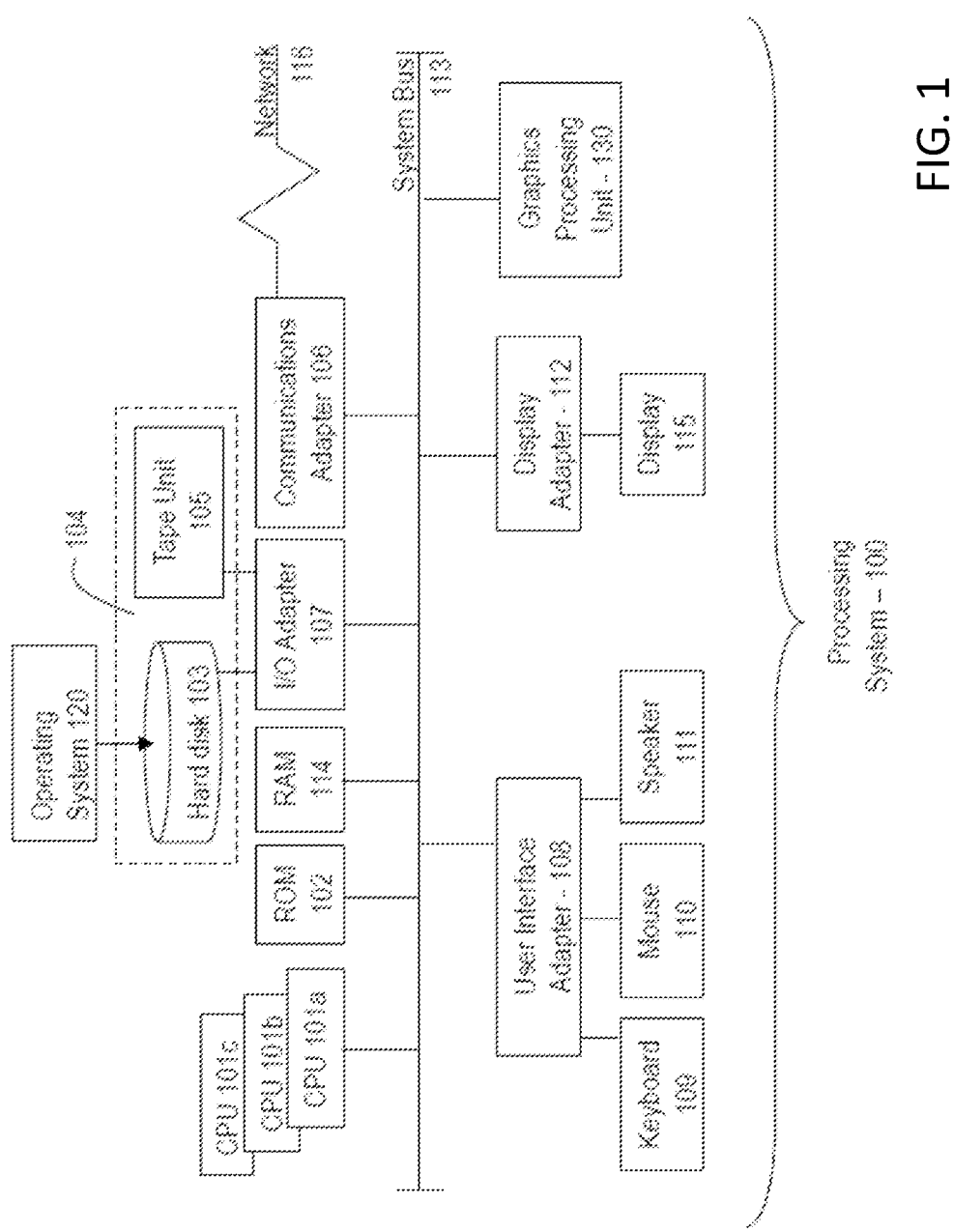
FIG. 1 is a block diagram illustrating one example of a processing system for practice of the teachings herein.

In accordance with exemplary embodiments of the invention, methods, systems, and computer program products for predicting target addresses of return branches are provided. As discussed above, during traditional branch target prediction, when call branches are identified, a return address stack is used to store the return addresses associated with the call addresses, where the return address stack is a last-in-first-out (LIFO) memory structure. The methods, systems, and computer program products described herein are directed to the utilization of a return address table to store return addresses during branch prediction.

In exemplary embodiments, when a branch instruction that is potentially a call is identified, a return address table is used to store the return address associated with the branch instruction. Each entry in the return address table includes an index value that is calculated based on a starting instruction address of the subroutine called by the call, also referred to herein as the target address. In addition, each entry in the return address table includes a return address that is the next sequential instruction address (NSIA) of the branch instruction.

In exemplary embodiments, distance heuristics are applied to a sequence of instructions during pre-processing to identify potential call and return instructions and a detection return address table is used to store the NSIA, which is used as a target address, of identified branch instructions that are potential calls. During the processing of the sequence of instructions, upon predicting a potential call from the branch-target-buffer (BTB), the call's sequential address, i.e., the return address, is written into a prediction return address table. Both the detection and prediction return address tables include entries that have an index value that is determined based on the target address of the call instruction. In addition, during the processing of the sequence of instructions, upon predicting a return from the BTB, the BTB specifies which prediction return address tables entry to use for the target address During traditional branch target prediction, when call branches are identified, a return address stack is used to store the return addresses associated with the call addresses, where the return address stack is a last-in-first-out (LIFO) memory structure. Due to the LIFO nature of the return address stack, recovery from a misprediction is difficult.

Embodiments described herein provide for a number of advantages and technical effects over the call/return stack branch target predictors. Such advantages include a table-based branch predictor for predicting return addresses that is simpler to implement than multi-level stack branch predictors, which increases the speed of accessing return address targets. In addition, the return address table is more capable than simple single-entry return predictors in the prior art and allows for a greater ability to recover from a misprediction and/or a pipeline flush.

Although embodiments are described herein in the context of branch prediction using BTB structures, the embodiments are not so limited, as one or more of the embodiments may be used in conjunction with various types of metadata and line-based predictors. In the following, the description of functions of various components and structures of the systems described herein may be considered to be part of one or more branch prediction methods.

Referring to FIG. 1, there is shown an embodiment of a processing system 100 for implementing the teachings herein. In this embodiment, the system 100 has one or more central processing units (processors) 101 a, 101 b, 101 c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
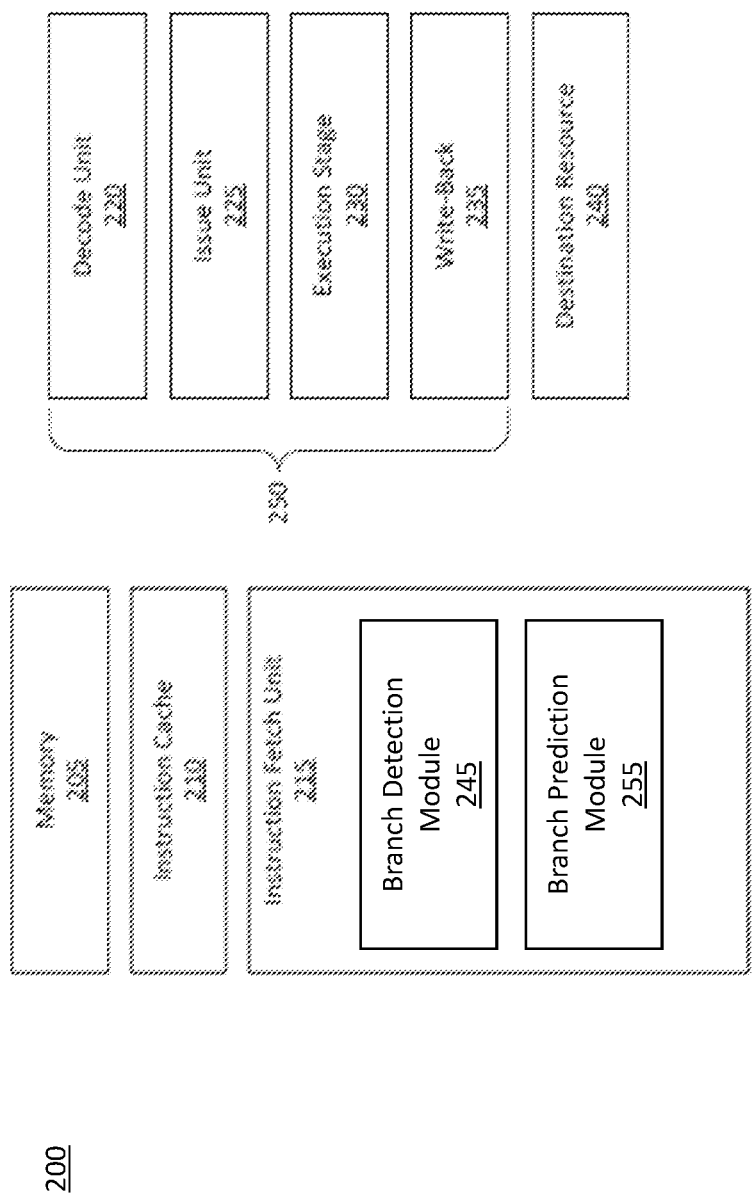
FIG. 2 is a block diagram illustrating an example of a processing system in accordance with an exemplary embodiment.

Now referring to FIG. 2, a block diagram of a processing system 200 according to an embodiment is depicted. The processing system 200 includes a memory 205, an instruction cache 210, an instruction fetch unit 215, a branch detection module 245, a branch prediction module 255, a destination resource 240 and a processing pipeline 250. The processing pipeline includes a decode unit 220, an issue unit 225, an execution stage 230, and/or a write-back 235. The processing system 200 may be included within a computer processor or otherwise distributed within a computer system. Instructions and data are stored in memory 205, and the instruction cache 210 accesses instructions in memory 205 and stores the instructions to be fetched. The memory 205 includes any type of volatile or non-volatile memory, such as cache memory. The memory 205 and instruction cache 210 can include multiple cache levels. A data cache (not depicted) may also be included in the processing system 200.

In FIG. 2, a simplified example of the instruction fetch unit 215 and the processing pipeline 250 are depicted. In one embodiment, the processing system 200 further includes multiple processing pipelines 250 and instruction fetch units 215. The processing pipeline 250 includes a decode unit 220, an issue unit 225, an execution stage 230, and write-back logic 235. The entire instruction fetch unit 215, the branch detection module 245, and/or the branch prediction module 255 may also be part of the processing pipeline 250. The processing pipeline 250 may include other features, such as error checking and handling logic, one or more parallel paths through the processing pipeline 250, and other features known in the art.

The instruction fetch unit 215 may fetch instructions from the instruction cache 210 for further processing by the decode unit 220. In some embodiments, the instruction fetch unit 215 includes branch detection module 245 and the branch prediction module 255. Alternatively, one or more of the branch detection module 245 and the branch prediction module 255 may be located separately from the instruction fetch unit 215. The instruction fetch unit 215 can also include other branch prediction logic (not depicted).

In exemplary embodiments, the decode unit 220 decodes instructions and passes the decoded instructions, portions of instructions, or other decoded data to the issue unit 225. The issue unit 225 analyzes the instructions or other data and transmits the decoded instructions, portions of instructions, or other data to one or more execution units in execution stage 230 based on the analysis. The execution stage 230 executes the instructions. The execution stage 230 includes a plurality of execution units, such as fixed-point execution units, floating-point execution units, load/store execution units, and vector execution units. The write-back logic 235 writes results of instruction execution back to a destination resource 240. The destination resource 240 may be any type of resource, including registers, cache memory, other memory, I/O circuitry to communicate with other devices, other processing circuits, or any other type of destination for executed instructions or data.

In exemplary embodiments, the branch detection module 245 performs a branch detection process to determine call-like and return-like branch instructions, for example, at completion time (i.e., past branch instruction execution time). That is, the branch detection method occurs at the point where a branch is known to be actually taken or not (i.e., a non-speculative point) as well as its correct target instruction address IA. For every completed branch taken, first, a distance D between the branches' branch instruction address (IA) and its target IA are compared. The distance may be a number of bytes, halfwords, etc. This may be done as an exact or imprecise compare. If the branch is not denoted as a return and the distance is greater than a threshold T, the next sequential IA (NSIA), also referred to herein as the return address, of the branch instruction is saved in a detection return address table and marked as valid as a potential call so the return point is known. The entry for the NSIA in the detection return address table includes an index value that is created based on the target address (TA) of the branch instruction.

Next, the TA of each successive branch is compared with entries of the detection return address table. For non-return type branches, if the TA of a successive branch matches a return address in the detection return address table, a return type branch is indicated. In one embodiment, upon detection of a match, the entry in the detection return address table is marked as invalid, completing the call-return pair, and the return address is recorded in a branch prediction table of the branch target buffer. If the values do not match, a return type branch is not indicated. It is important to note that in this example implementation, only return-like branches are marked in a branch prediction table. Call-like branches can be marked too in other examples to further improve the design and implementation efficiency. For the compare against the NSIA, a match can be defined as an exact match or with a set of allowable offsets for cases where calling conventions allow return instructions to return to addresses at sequential offsets beyond the call's NSIA, for example, +2, +4, +6 bytes. The offset to use when predicting the target address of a return can be stored with the return branch in the branch prediction tables.

Similar to the branch detection process described above, the branch prediction module 255 performs a branch prediction process whenever a predicted branch is taken. The distance D between the branch IA and the target IA is compared. The distance may be a number of bytes, halfwords, etc. This may be done as an exact or imprecise compare. If the distance D is greater than a threshold T, the NSIA, or return address, is saved in a prediction return address table and marked as valid. The entry for the NSIA in the prediction return address table includes an index value that is created based on the target address (TA) of the branch instruction. Next, for every predicted taken branch marked as a return in the branch prediction tables, the value for the target IA stored in the prediction return address table is used as the target IA prediction, with the determined offset added to it if applicable, if entry in the prediction return address table is marked as valid. In some embodiments, entries in the prediction return address table are marked as invalid, completing the call-return pair. Otherwise, existing target prediction structures are used. It is important to note that since only return-like branches are marked in the branch prediction tables, call-like branches continue to be predicted by existing branch predictors.

Figure 3:
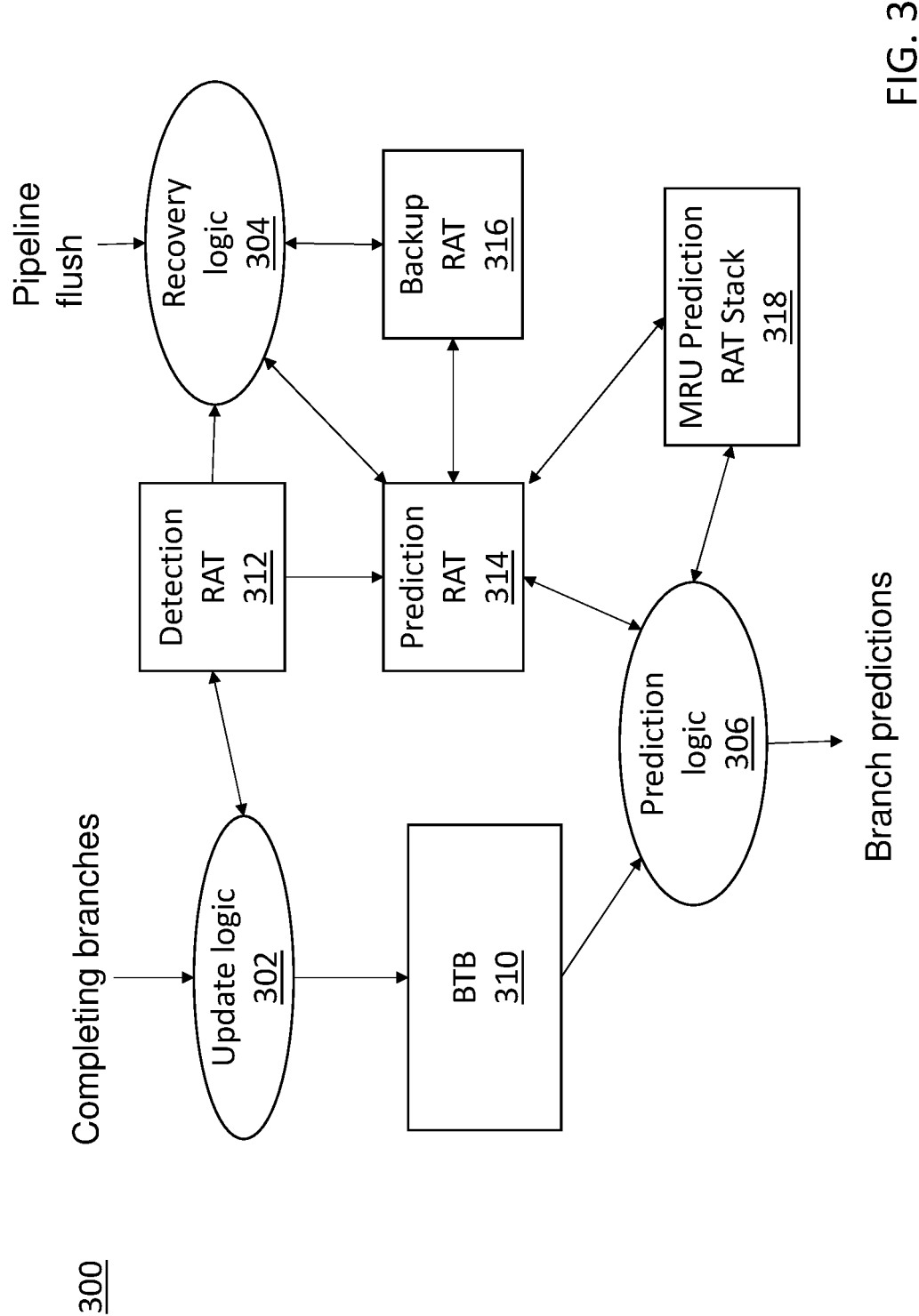
FIG. 3 depicts a flow chart diagram of an operation of a system for branch target prediction utilizing return address tables in accordance with an exemplary embodiment.

Referring now to FIG. 3, a flow chart diagram of a system 300 for branch target prediction utilizing return address tables in accordance with embodiments of the invention is shown. As illustrated, the system includes update logic 302 which receives information regarding completing branch instructions from a processing pipeline and responsively updates both a detection return address table (RAT) 312 and branch target buffer (BTB) 310. The detection RAT 312 includes a plurality of entries that each correspond to an index value that is calculated based on the target address of a branch instruction that is used to create the entry. Each of the entries includes a validity bit, a return address of the branch instruction, and optionally a branch identification that is created based on an order in which the entries are added to the detection return address table. In exemplary embodiments, the update logic 302 includes distance heuristics that are applied to a sequence of instructions to identify branch instructions that are potential call and return instructions, and the detection RAT 312 is used to store NSIA, which is used as a target address, of identified branch instructions that are potential calls. In exemplary embodiments, the update logic 302 is embodied in a branch detection module 245 of the processing system 200. In one embodiment, the return address in the entries of the detection RAT includes a full return address. In another embodiment, the return address in the entries of the detection RAT include either a portion of return address or hash of the full return address.

The system 300 also includes a prediction RAT 314 that is created by a prediction logic 306. The prediction RAT 314 includes a plurality of entries that each correspond to an index value that is calculated based on the target address of a branch instruction that is used to create the entry. Each of the entries includes a validity bit, a return address of the branch instruction, and optionally a branch identification that is created based on an order in which the entries are added to the prediction return address table. During the processing of a sequence of instructions by the prediction logic 306, upon predicting a potential call from the branch-target-buffer (BTB), the call's sequential address, i.e., the return address, is written into a prediction RAT 314. In addition, during the processing of the sequence of instructions by the prediction logic 306, upon predicting a return from the BTB 310, the BTB 310 specifies which entry in the prediction RAT 312 to use for the target address. In exemplary embodiments, the prediction logic 306 is embodied in a branch prediction module 255 of the processing system 200.

In exemplary embodiments, the system 300 also includes a recovery logic 304 which receives an indication of a pipeline flush and responsively updates the prediction RAT 314. In some embodiments, the recovery logic 304 utilizes one or more of the detection RAT 312 and/or a backup RAT 316 to update the prediction RAT 314 upon the occurrence of a pipeline flush. In exemplary embodiments, the backup RAT 316 is configured to store entries that are evicted from the prediction RAT 314. The backup RAT 316 includes one or more entries that each include a validity bit, a return address and a branch identification.

In exemplary embodiments, the system 300 also includes a prediction logic 306 that is configured to provide a branch prediction to the processing pipeline. The prediction logic 306 is configured to utilize both the prediction RAT 314 and the BTB 310 to provide a branch prediction to the processing pipeline. In some embodiments, the prediction logic 306 is further configured to utilize a most recently used (MRU) prediction RAT stack 318 to provide a branch prediction to the processing pipeline. In one embodiment, the MRU prediction RAT stack 318 is configured to store the index values of the prediction RAT 314 in the order in which they were most recently used. In exemplary embodiments, the use of the MRU prediction RAT stack 318 is configured to increase the speed in which the system 300 is able to provide a branch prediction to the processing pipeline, as discussed in further detail with reference to FIGS. 7A and 7B.

Figures 4A, 4B:
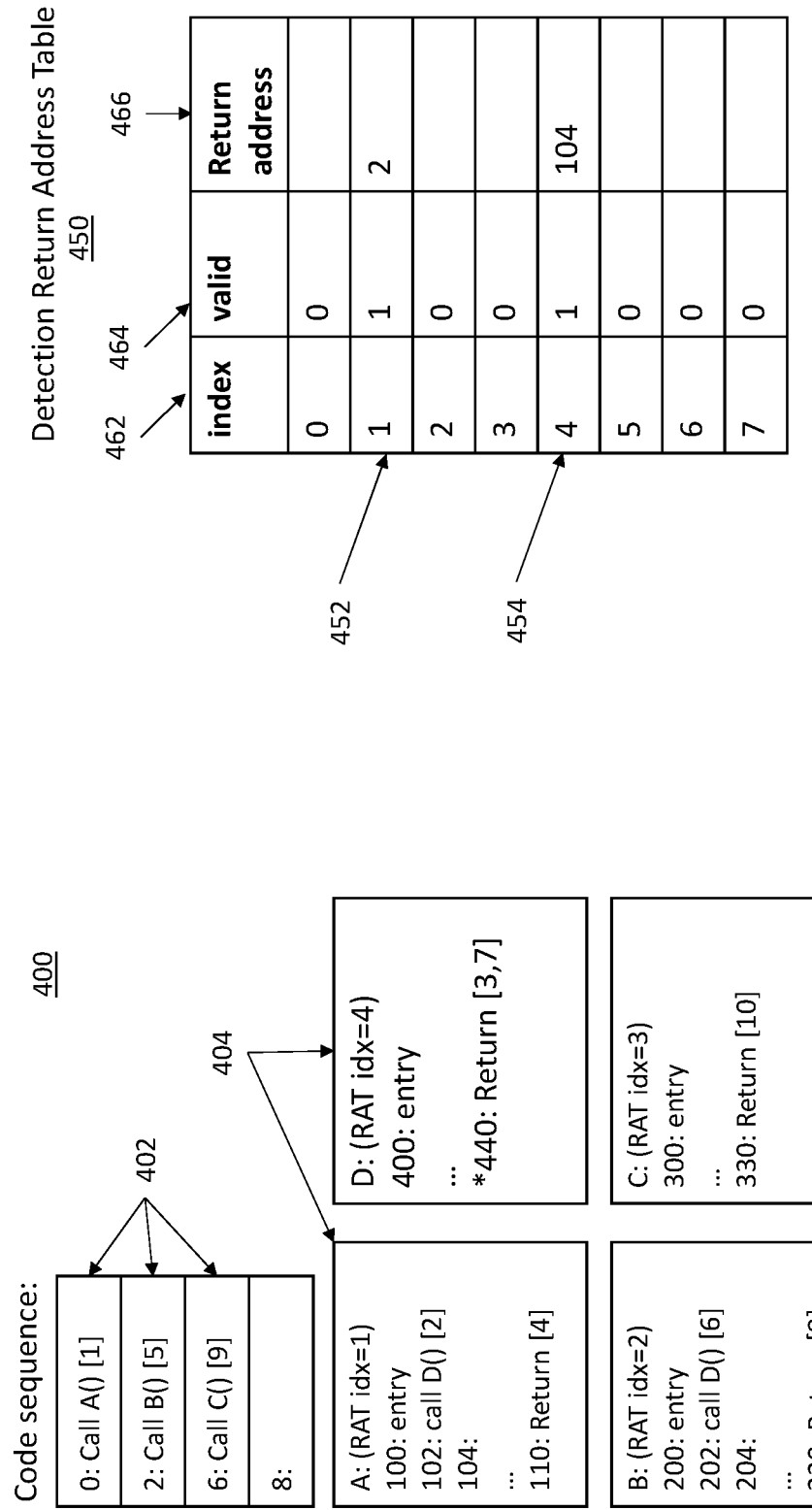
FIG. 4A is a block diagram illustrating an example of a code sequence in accordance with an exemplary embodiment.
FIG. 4B is a block diagram illustrating a detection return address table created based on the code sequence shown in FIG. 4A in accordance with an exemplary embodiment.

FIG. 4A is a block diagram illustrating an example of a code sequence 400 in accordance with an exemplary embodiment. As illustrated the code sequence 400 includes a sequence of instructions 402, each of which are a call to one of a plurality of functions 404. Each time a call instruction 402 is encountered during pre-processing of the code sequence, an entry is created and/or updated in the detection return address table 450, shown in FIG. 4B. For example, upon encountering instruction Call(A) at address 0, an entry 452 is created in the detection return address table 450. As illustrated, the entry 452 includes an index value 462 of 1, that is created based on the target address (TA) of the Call(A) instruction, and a validity bit 464 that is set to 1, i.e., valid, a return address 466 of 2, which indicates the next sequential IA (NSIA). Next, during processing of the Call (D) instruction at address 102, entry 454 is created in the detection return address table 450. As illustrated, the entry 454 includes an index value 462 of 4, which is determined based on the target address (TA) of the Call(D) instruction, a validity bit 454 that is set to 1, i.e., valid, and a return address 466 of 104, which indicates the next sequential IA (NSIA).

Figures 4C, 4D:
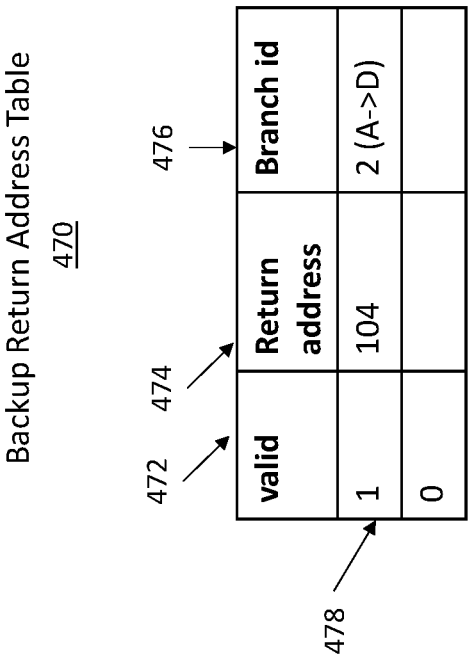
FIG. 4C is a block diagram illustrating a prediction return address table created based on the code sequence shown in FIG. 4A in accordance with an exemplary embodiment.
FIG. 4D is a block diagram illustrating a backup return address created based on the code sequence shown in FIG. 4A and the prediction return address table shown in FIG. 4C in accordance with an exemplary embodiment.

Referring now to FIG. 4C, a block diagram of a prediction return address table 460 that is created during the processing of the code sequence 400 shown in FIG. 4A is shown. The prediction return address table 460 is similar to the detection return address table 450 and includes a plurality of entries that each includes an index value 462, a validity bit 464, and a return address 466. In one embodiment, the prediction return address table 460 includes a branch identification (ID) field 468 that is configured to store an indication of the sequence that the entries are added to the prediction return address table 460. For example, the branch ID field 468 can store a sequential number that is incremented by one each time an entry is added to the prediction return address table. During the processing of the code sequence 400, each time a call instruction 402 is encountered, an entry is created and/or updated in the prediction return address table 460, shown in FIG. 4B. For example, upon encountering instruction Call(A) at address 0, an entry 452 is created in the prediction return address table 460. As illustrated, the entry 452 includes an index value, 1, that is determined based on the target address (TA) of the Call(A) instruction, a validity bit that is set to 1, i.e., valid, a return address of 2, which indicates the next sequential IA (NSIA), and a branch identification of 1, which indicated a sequential number that is incremented by one each time an entry is added to the prediction return address table 460. Next, during the processing of the Call(D) instruction at address 102, entry 454 is created in the prediction return address table 460. As illustrated, the entry 454 includes an index value, 4, that is created based on the target address (TA) of the Call(D) instruction, a validity bit that is set to 1, i.e., valid, a return address of 104, which indicates the next sequential IA (NSIA), and a branch identification of 2, which indicated a sequential number that is incremented by one each time an entry is added to the prediction return address table 460. In one embodiment, during the processing of the code sequence, when the instruction return instruction at address 440 is processed, the validity bit of entry 454 of the prediction return address table 460 is set to 0, i.e., invalid. In other embodiments, the validity bit of entry 454 of the prediction return address table 460 remains set to 1 i.e., valid.

Although the detection return address table 450 and the prediction return address table 460, are shown as having eight entries, i.e., a 3-bit index value, it will be clear to those of ordinary skill in the art the detection return address table 450 and the prediction return address table 460 are not limited to table of these sizes and that a 4, or 5-bit index value can be used resulting in a table with 16 or 32 entries, respectively.

Referring now to FIG. 4D, a block diagram of a backup return address table 470 that is created during the processing of the code sequence 400 shown in FIG. 4A is shown. In exemplary embodiments, the backup return address table 470 is configured to store entries that are evicted from the prediction return address table 460. The backup return address table 470 includes one or more entries 478 that each include a validity bit 472, a return address 474, and a branch identification 476. In exemplary embodiments, when an entry is added to the backup return address table 470 the validity bit is set to 1, i.e., valid.

Returning to FIG. 4C, in one embodiment, during the continued execution of the code sequence 400, shown in FIG. 4A, the processing of the Call(B) instruction at address 2, entry 456 is created in the prediction return address table 460. As illustrated, the entry 456 includes an index value, 2, that is created based on the target address (TA) of the Call(B) instruction, a validity bit that is set to 1, i.e., valid, a return address of 6 which indicates the next sequential IA (NSIA), and a branch identification of 5, which indicated a sequential number that is incremented by one each time an entry is added to the prediction return address table 460. Next, during the processing of the instruction Call(D) at address 202 is encountered, entry 454 will be written to the prediction return address table 460 and the existing entry, with branch ID of 2, will be evicted from prediction return address table 460 and will be written to the backup return address table 470, as entry 478. As illustrated, the entry 454 includes an index value, 4, that is created based on the target address (TA) of the Call(B) instruction, a validity bit that is set to 1, i.e., valid, a return address of 204 which indicates the next sequential IA (NSIA), and a branch identification of 6, which indicated a sequential number that is incremented by one each time an entry is added to the prediction return address table 460. In exemplary embodiments, if a flush event invalidates entry 454 (branch ID 6) in the prediction return address table 460, entry 478 (branch ID 2) from the backup return address table 470 will be restored to the prediction return address table 460. Once the entry 478 is used to restore an entry in the prediction return address table 460, entry 478 will have its validity bit set to zero. Likewise, the validity bit for entry 478 will be set to invalid upon a determination that the entry was created by a branch instruction that was flushed from the processing pipeline or a determination that the entry was created by a branch instruction that has been completed.

In exemplary embodiments, upon the occurrence of a pipeline flush, entries in the prediction return address table that are associated with calls that were flushed are invalidated, i.e., their validity bit is set to 0. Likewise, entries in the backup return address table that are associated with calls that were flushed are also invalidated. For each invalidated prediction return address table entry, the youngest valid backup return address table entry is restored into the prediction return address table. If there are no valid backup entries in the backup return address table, entries in the prediction return address table are restored from valid entries in the detection return address table. In exemplary embodiments, when a flush event is triggered by a mispredicted call, the prediction return address table entry associated with the mispredicted call is invalidated, even though the call instruction is not flushed from the pipeline. After such an invalidation, if the branch is resolved taken and the target was mispredicted, if it still appears to be a potential call instruction (meets the distance heuristic), some exemplary embodiments will initialize an entry in the prediction RAT in the same way that predicting the call branch to this now known-to-be-correct target would have. Similarly exemplary embodiments may initialize prediction RAT entries for surprise taken branches, and mispredicted branches (directions or targets) that appear to be potential calls but were not detected as such by the branch prediction logic due to having the wrong prediction or not having a prediction at all at that time frame in the branch prediction search process.

Figure 5:
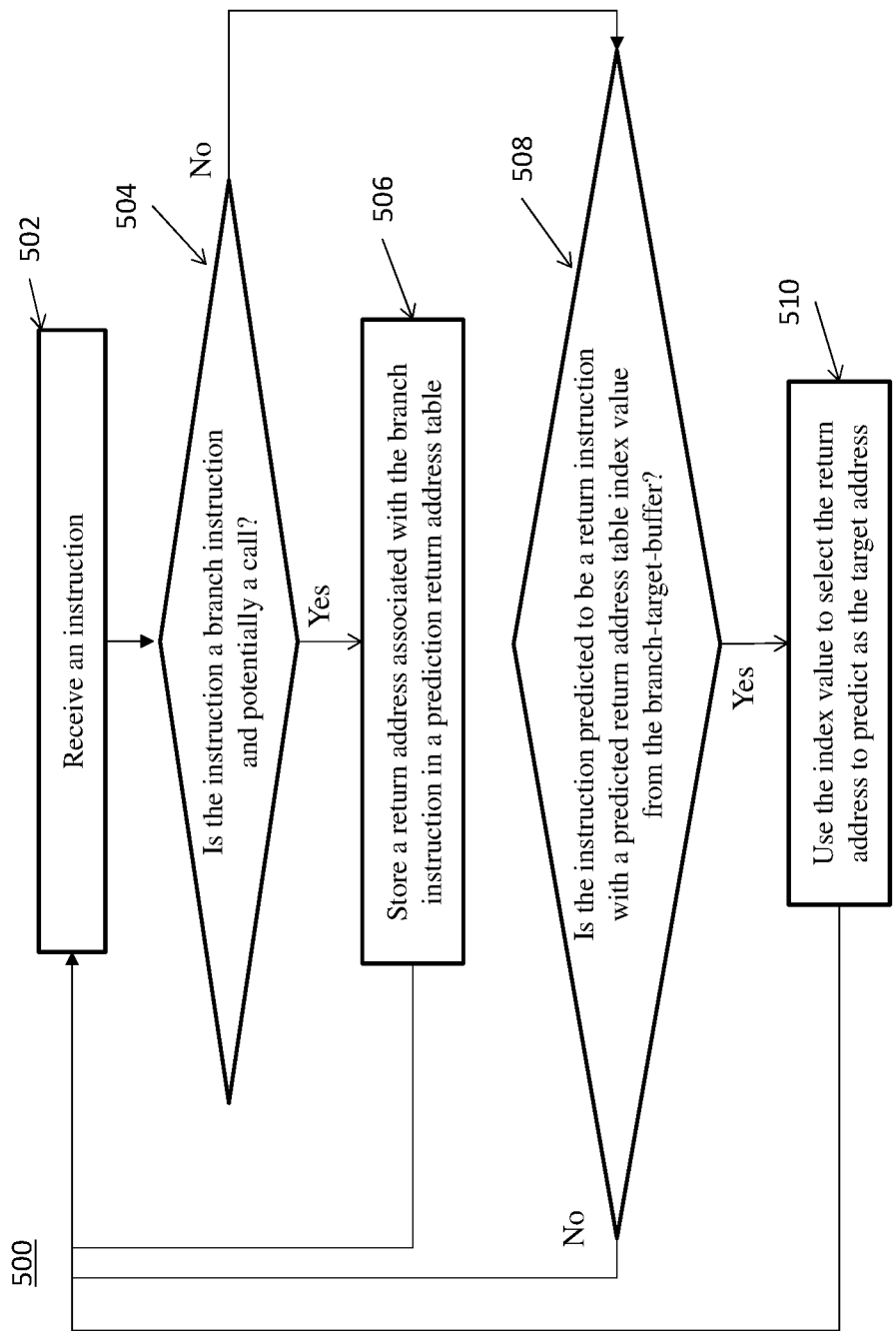
FIG. 5 is a flowchart diagram illustrating a method for storing return addresses in a prediction branch-target-buffer in accordance with an exemplary embodiment.

Referring now to FIG. 5, a flowchart diagram illustrating a method 500 for storing return addresses in a prediction branch-target-buffer in accordance with an exemplary embodiment is shown. In exemplary embodiments, the method 500 is performed by a branch prediction module 255 of the processing system 200 shown in FIG. 2. As shown at block 502, the method 500 beings by receiving an instruction. In one embodiment, the instruction is received from the processor pipeline. In another embodiment, the instruction is a metadata prediction that there is expected to be a branch instruction at a particular instruction address upcoming in the instruction stream. Next, as shown at decision block 504, the method 500 includes determining if the instruction is a branch instruction and potentially a call instruction. In one embodiment, distance heuristics are used to determine if the branch instruction and potentially a call instruction. If the instruction is not a branch instruction which is potentially a call instruction, the method 500 proceeds to decision block 508. Otherwise, the method 500 proceeds to block 506 and stores a return address associated with the branch instruction in a prediction return address table. In exemplary embodiments, each entry of the prediction return address table includes a return address, which is created based on an address of a sequential instruction of the first instruction, and each entry is labeled with an index value that is created based on a target address of the first instruction and a return address.

Next, as shown at decision block 508, the method 500 includes determining whether the instruction is predicted to be a return instruction with a predicted return address table index value from the branch-target-buffer. If the instruction is predicted to be a return instruction with a predicted return address table index value from the branch-target-buffer, the method 500 proceeds to block 510 and uses the index value to select the return address to predict as the target address. Otherwise, the method 500 returns to block 502.

In exemplary embodiments, each entry of the prediction return address table also includes a validity bit that is set to valid upon a new entry being stored in the prediction return address table. In some embodiments, once a determination is made that the second instruction is predicted return address table index value from the branch-target-buffer, the validity bit of the entry is set to be invalid. In other embodiments, the validity bit remains set to valid even after a determination is made that the second instruction is predicted return address table index value from the branch-target-buffer is made.

In exemplary embodiments, each entry of the prediction return address table includes a branch identification value that is created based on an order in which the entries are added to the prediction return address table. In one embodiment, when the branch prediction module determines that a flush event has occurred in the processing pipeline, the validity bit of one or more entries of the prediction return address table are set to be invalid. The determination of which of the one or more entries of the prediction return address table that should have the validity bit set to be invalid is based on the branch identification values. In one embodiment, entries that have branch identification values that indicate the one or more entries were created by branch instructions that were flushed from the processing pipeline have their validity bit set to be invalid. Accordingly, instructions that were entered into the prediction return address table includes after the instruction that caused the pipeline flushed are marked as invalid in the prediction return address table.

Referring now to FIG. 6, a flowchart diagram illustrating a method 600 for storing return addresses in a detection return address table in accordance with an exemplary embodiment is shown. In exemplary embodiments, the method 600 is performed by a branch detection module 245 of the processing system 200 shown in FIG. 2. As shown at block 602, the method 600 beings by receiving an instruction. Next, as shown at decision block 604, the method 600 includes determining if the instruction is a branch instruction and potentially a call or return instruction. In one embodiment, distance heuristics are used to determine if the branch instruction is potentially a call or return instruction. If the instruction is a branch instruction which is potentially a call or return instruction, the method 600 proceeds to block 610. Otherwise, the method 600 returns to block 602. In exemplary embodiments, each entry of the detection return address table is labeled with an index value that is created based on a target address of the first instruction and each entry includes a return address, which is created based on an address of a sequential instruction of the first instruction.

Next, as shown at block 610, the method 600 includes searching the detection return address table for an entry having a return address value that corresponds to the target address of the instruction. The method 600 then proceeds to decision block 608 and determines whether the instruction is predicted to be a return instruction. If the instruction is predicted to be a return instruction, the method 600 proceeds to block 612 and writes the index value associated with the entry into the branch-target-buffer. Otherwise, the method proceeds to block 606 and stores a return address associated with the branch instruction in a detection return address table.

One drawback of utilizing a return address table over the previously used return address stack is that additional time is required to look up entries in the return address table, which can result in a delay in providing the branch prediction. For example, in a sixteen-entry return address table, where entries are indexed as a function of the target IA of that of the calling branch, a return branch (per thread) will denote this 4-bit ID in the BTB. In some cases, upon making a BTB prediction, the 4-bit index (per thread) cannot be available early enough to provide the return target in time. Accordingly, in exemplary embodiments, a prediction logic is configured to utilize both a prediction RAT and a most recently used (MRU) prediction RAT stack to increase the speed at which a branch prediction is provided. In an exemplary embodiment, the MRU prediction RAT stack is configured to store the index values of the prediction RAT in the order in which they were most recently used.

In exemplary embodiments, the branch prediction module, shown in FIG. 2, is configured to maintain the most recently used stack to track an order in which the entries of the prediction return address table are installed. Each entry of the most recently used stack includes a validity bit that is set to valid upon a branch instruction being written to the prediction return address table and that is set to invalid upon a return branch instruction leveraging a table entry to make a return target address prediction. Upon the branch prediction module detecting a return branch instruction, the branch prediction module obtains the index value of the prediction return address table corresponding to a number of most recently installed valid entries of the most recently used stack. In exemplary embodiments, the number of most recently installed valid entries is set to be one of two, three, or four.

Next, the branch prediction module compares the index value of the prediction return address table corresponding to the selected number of most recently installed valid entries of the most recently used stack to an index value received from the branch-target-buffer. If there is not a match between any of the selected number of most recently installed valid entries of the most recently used stack to an index value received from the branch-target-buffer, the index value received from the branch-target-buffer is used to look up an entry in the prediction return address table. If there is a match between any of the selected number of most recently installed valid entries of the most recently used stack to an index value received from the branch-target-buffer: the return address corresponding to the matched index value is provided; a head pointer is updated to point to the next valid entry that is the next most recently installed post the index value provided by the branch-target-buffer; and the validity bit of one or more entries of the most recently used stack based on the comparison are updated. In exemplary embodiments, the validity bit of the matched entry is set to invalid, and the validity bits of any entries that are more recently used than the matched entry are also set to invalid. In exemplary embodiments, based on a determination, by the branch prediction module, that a flush event has occurred in the processing pipeline, the validity bit of each of the entries of the most recently used stack is set to be equal to the validity bit of the corresponding entry in the prediction return address table.

Referring now to FIGS. 7A and 7B a code sequence and a most recently used stack created based on the code sequence in accordance with an exemplary embodiment are respectively shown. As illustrated the code sequence begins by installing branches A, B, C, and D, i.e., writing entries into the prediction RAT for a Call(A) instruction, followed by a Call(B) instruction, and so on. As each instruction is written to the prediction RAT, a most recently used prediction RAT stack 702, also referred to herein as the MRU stack 702, is updated. Each entry 704 in the MRU stack 702 corresponds to a unique index value in the prediction RAT and each entry includes a validity bit 708 that is set to 1, i.e., valid, when the entry 704 is added to the MRU stack 702. The MRU stack 702 also includes a head pointer 706, which points to the most recently added entry 702 that has a validity bit 708 which is set to valid.

Continuing with reference to FIGS. 7A and 7B, after branches A, B, C and D are installed in the prediction RAT and added to the MRU stack, a return instruction is encountered, which is a Return(D). In exemplary embodiments, when a return instruction is encountered, the MRU stack 702 is configured to return a predetermined number of entries starting from the head pointer 706. In the illustrated embodiment, the predetermined number is two, and accordingly, the MRU stack 702 returns the RAT index value for branches D and C. Since the return instruction was Return(D), there was a match with branch D and the validity bit 708 of D in the MRU stack 702 is set to 0, i.e., invalid. Since instruction C was less recently used than D, its validity bit remains at 1, however, if C was more recently used than D, its validity bit would have been set to 0. After the validity bit of D is set to zero, the head pointer 706 is updated to point to branch C, as it is the most recently used valid entry in the MRU stack 702.

Next, branch E is installed in the prediction RAT and added to the MRU stack 702. In addition, the head pointer 706, is updated to point to branch E, as it is the most recently used valid entry in the MRU stack 702. A return branch is then encountered and the MRU stack 702 returns the RAT index value for branches E and C. Since the return instruction was Return(E), there was a match with branch E and the validity bit 708 of E in the MRU stack 702 is set to 0, i.e., invalid and the head pointer is updated to point to branch C. Next, another return branch is encountered and the MRU stack 702 returns the RAT index value for branches C and B. Since the return instruction was Return(B), there was a match with branch B, and the validity bit 708 of B in the MRU stack 702 is set to 0, i.e., invalid. In addition, the validity bit 708 of C in the MRU stack 702 is also set to 0 because branch C was more recently used than branch B. Next, another return branch is encountered and the MRU stack 702 returns the RAT index value for branch A, as it is the only remaining valid entry 704. Since the return instruction was Return(A), there was a match with branch A and the validity bit 708 of A in the MRU stack 702 is set to 0, i.e., invalid.

In an embodiment, a branch predictor is configured to perform branch prediction methods using a level one BTB (also referred to as a "BTB1") having slots for storing branch entries (also referred to as "branches"). The slots may have at least two different entry formats or sizes (e.g., a medium entry format and a large entry format). Methods in this embodiment include dynamically changing a format of an incoming branch (also referred to as a "branch format") to match the entry format of a slot. The methods in this embodiment may also include changing the format of an existing branch and/or changing the format of a slot. The format changes are performed, for example, to increase or maximize the storage capacity of a BTB1.

In an embodiment, the hierarchical metadata prediction system includes a level two BTB (also referred to as a "BTB2") having multiple array instances (referred to herein as "containers"), which may be physically separate. The containers may be configured to have a plurality of different sizes. For example, the BTB2 includes a first set (i.e., at least one) of containers having a first size and a second set of containers having a second size. Methods of branch prediction according to this embodiment include writing branches from a BTB1 to BTB2 containers according to a selection process to improve or maximize branch density in the BTB2.

The hierarchical metadata prediction system may be a parent-based system in which lines of the BTB1 and/or the BTB2 are divided into parent arrays. For example, the BTB1 is divided into a plurality of parents, where each parent can store a plurality of branches, and each parent is further divided into a plurality of sub-parent arrays, which may be half parent arrays, quarter parent arrays or sub-parent arrays of any suitable size. Although descriptions herein are in the context of half parents, it is noted that the descriptions may be applicable to sub-parent arrays of various sizes. Each half parent includes slots for storing branch entries. In an embodiment, the BTB2 is configured to have sub-parent granularity and dynamic associativity, allowing parts of parent entries to be separately written so as to increase density in the BTB2 and reduce underutilization of the BTB2.

Figure 8A:
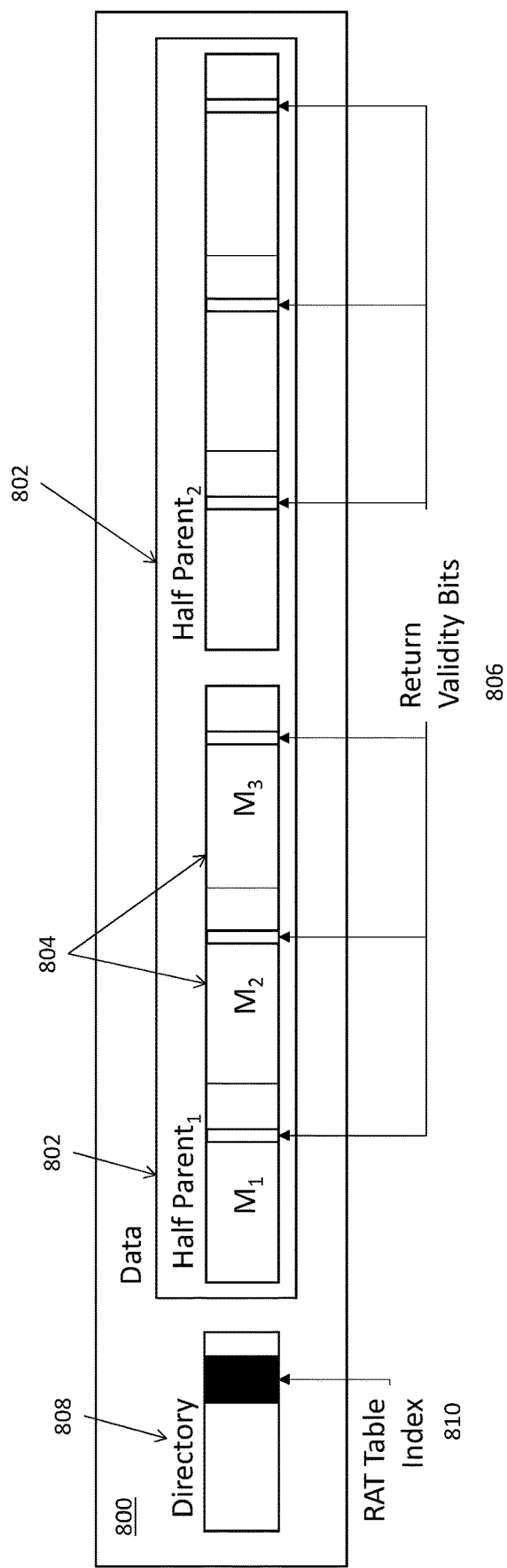
FIGS. 8A, 8B and 8C are block diagram illustrating a BTB parent array including half parents, each half parent divided into variable format slots in accordance with an exemplary embodiment.
Figure 8B:
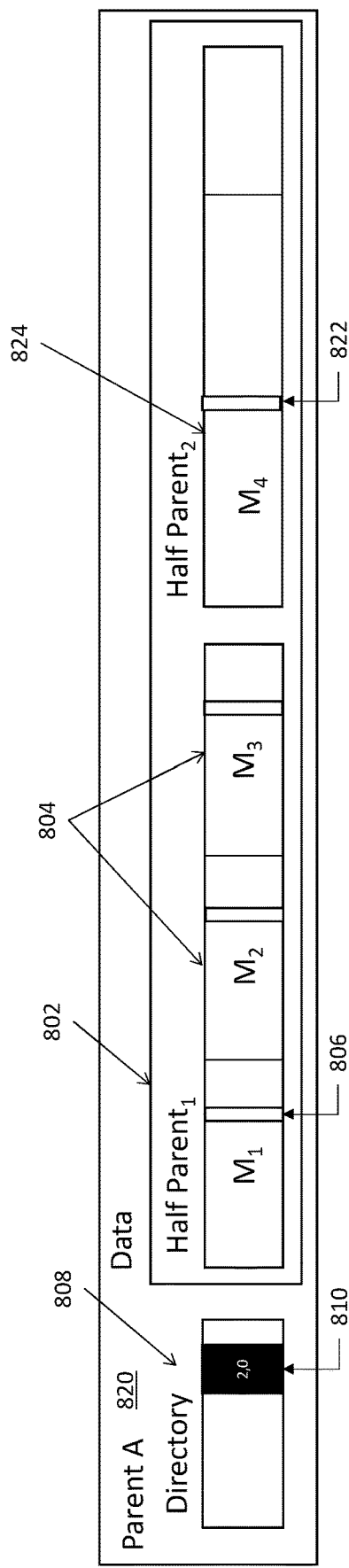
Figure 8C:
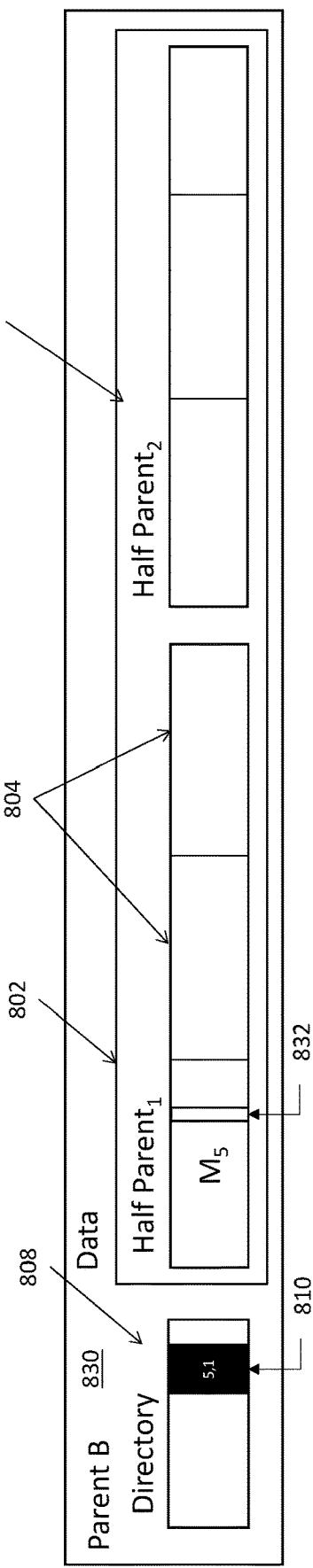

Referring now to FIGS. 8A, 8B and 8C block diagrams illustrating BTB parent arrays including half parents, each half parent divided into variable format slots in accordance with an exemplary embodiment are shown. As illustrated, the BTB includes a parent array 800 that includes a first half parent 802 and a second half parent 802. The parent 800 includes a plurality of entries 804 that each include branch data $M_1$, $M_2$, and $M_3$ and a return validity bit 806, which is set to 1 if the instruction is a return instruction and 0 if the instruction is not a return instruction. In exemplary embodiments, branches are one of two sizes, medium and large and an M instruction, as shown in FIGS. 8A, 8B and 8C represent a medium sized branch. In one embodiment, a parent is able to fit three medium branches or two large branches.

The parent 800 also includes a directory 808 that includes a single RAT table index value 810, which corresponds to each return instruction in the parent 800. For example, if $M_1$ and $M_2$ have a return validity bit of 1 and $M_3$ has a return validity bit of zero, both $M_1$ and, $M_2$ are return instructions that have the same RAT table index value 810. In exemplary embodiments, the single index value for the prediction return address table corresponds to the oldest branch entry that was installed into that parent of the two or more branch entries.

In exemplary embodiments, when a new branch instruction is added to the BTB parent array 800, a tag value is determined for the new branch. If the tag value does not match the tag value any existing parent 800, a new parent is created, and the new branch entry is written to the new parent and the tag value of the new parent to be the tag value determined for the new branch. If the tag value matches the tag value of an existing parent 800, the new branch entry is written into a vacant branch entry of that existing parent. If there is not a vacant branch entry of that existing parent, a new parent is created and the new branch entry is written to the new parent and the tag value of the new parent is set to the tag value determined for the new branch.

In one example, as shown in FIG. 8B, a new branch $M_4$ is added to the BTB and the branch $M_4$ has an tag value that is the same as the tag value in Parent A 820. Accordingly, the branch $M_4$ is added to a vacant entry 824 of Parent A 820 and has a validity bit 822 set to 1. In another example, as shown in FIG. 8C, a new branch $M_5$ is added to the BTB and the branch $M_5$ has a tag value that is different from the index value in Parent A 820. Accordingly, a new Parent B 830 is created and the branch $M_5$ is added to a vacant entry of Parent B 830 and has a validity bit 822 set to 1.

In one embodiment, the RAT index is stored with the directory and hence every branch within a parent's row class that is denoted as a return branch leverages the same RAT entry. In another embodiment, a RAT entry could be stored individually with each branch data just as a valid bit is stored with each branch data (M #).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. The method for storing return addresses for a branch-target-buffer, the method comprising:
    receiving, by a branch prediction module, a first instruction;
    based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored;

receiving, by the branch prediction module, a second instruction;

based on a determination, by the branch prediction module, that the second instruction is predicted to be a return instruction with a predicted return address table index value from the branch-target-buffer, using the index value to select the return address to predict as the target address.

2. The method of claim 1, further comprising:

receiving, by a branch detection module, the first instruction;

based on a determination, by the branch detection module, that the first instruction is a branch instruction and potentially a call, storing the return address associated with the first instruction in a detection return address table, wherein the detection return address table includes the index value and the return address;

receiving, by the branch detection module, a second instruction;

based on a determination, by the branch detection module, that the second instruction is a return instruction, searching the detection return address table for an entry having a return address value that corresponds to the target address of the second instruction; and writing the index value for the entry into the branch-target-buffer.

3. The method of claim 1, further comprising setting the validity bit of the entry to be invalid based on the determination, by the branch prediction module, that the second instruction is a return instruction and applying such entry for a pipeline prediction.

4. The method of claim 1, wherein the prediction return address table further includes a branch identification value that is created based on an order in which the entries are added to the prediction return address table.

5. The method of claim 4, further comprising based on a determination, by the branch prediction module, that a flush event has occurred in the processing pipeline, setting the validity bit of one or more entries of the prediction return address table to be invalid, wherein the one or more entries have branch identification values that indicate the one or more entries were created by branch instructions that were flushed from the processing pipeline.

6. The method of claim 1, further comprising:

based on a determination, by the branch prediction module, that an entry in the prediction return address table is being evicted from the prediction return address table, storing the entry in a backup return address table.

7. The method of claim 6, further comprising:

invalidating, by the branch prediction module, an entry in the backup return address table upon an occurrence of one of: the entry being restored to the prediction return address table; a determination that the entry was created by a branch instruction that was flushed from the processing pipeline; and a determination that the entry was created by a branch instruction that has been completed.

8. The method of claim 1, further comprising:

maintaining, by the branch prediction module, a most recently used stack configured to track an order in which the entries of the prediction return address table are installed, wherein each entry of the most recently used stack includes a validity bit that is set to valid upon a branch instruction being written to the prediction return address table and that is set to invalid upon a return branch instruction leveraging a table entry to make a return target address prediction.

9. The method of claim 8, further comprising:

obtaining, by the branch prediction module upon detecting a return branch instruction, the index value of the prediction return address table corresponding to a number of most recently installed valid entries of the most recently used stack.

10. The method of claim 9, further comprising:

comparing, by the branch prediction module, the index value of the prediction return address table corresponding to the number of most recently installed valid entries of the most recently used stack to an index value received from the branch-target-buffer; and selecting one of the number of most recently installed valid entries given an index value match; and updating the MRU pointer to point to the next valid entry that is next most recently installed post the index value provided by the branch-target-buffer; and updating the validity bit of one or more entries of the most recently used stack based on the comparison.

11. The method of claim 10, further comprising:

based on a determination that none of the number of most recently installed valid entries match the index value received from the branch-target-buffer, looking up the index value received from the branch-target-buffer in the prediction return address table.

12. The method of claim 8, further comprising:

based on a determination, by the branch prediction module, that a flush event has occurred in the processing pipeline, setting the validity bit of each of the entries of the most recently used stack to be equal to the validity bit of the corresponding entry in the prediction return address table.

13. The method of claim 1, wherein the branch-target-buffer is split into a plurality of parents that each support multiple branch entries, wherein each branch entry represents a branch instruction and includes a valid bit, and wherein each parent index includes a single index value for the prediction return address table.

14. The method of claim 13, wherein the single index value for the prediction return address table corresponds to an oldest return branch entry of the two or more return branch entries.

15. The method of claim 14, further comprising:

receiving a new branch entry to add to the branch-target-buffer, the new branch entry including a first index value;

based on a determination that the single index value of one of the plurality of parents, which has a vacant branch entry, matches the first tag value, writing the new branch entry into the vacant branch entry;

based on a determination that none of the plurality of parents with the single tag value that matches the first value have a vacant branch entry, writing the new branch entry to a new parent and setting the single tag value of the new parent to be the new associated branch address value.

16. A system comprising a memory having computer readable instructions and one or more processors for executing the computer readable instructions, the computer readable instructions controlling the one or more processors to perform operations comprising:

receiving, by a branch prediction module, a first instruction;

based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored;

receiving, by the branch prediction module, a second instruction;

based on a determination, by the branch prediction module, that the second instruction is predicted to be a return instruction with a predicted return address table index value from the branch-target-buffer, using the index value to select the return address to predict as the target address.

17. The system of claim 16, wherein the operations further comprise:

receiving, by a branch detection module, the first instruction;

based on a determination, by the branch detection module, that the first instruction is a branch instruction and potentially a call, storing the return address associated with the first instruction in a detection return address table, wherein the detection return address table includes the index value and the return address;

receiving, by the branch detection module, a second instruction;

based on a determination, by the branch detection module, that the second instruction is a return instruction, searching the detection return address table for an entry having a return address value that corresponds to the target address of the second instruction; and writing the index value for the entry into the branch-target-buffer.

18. The method of claim 16, wherein the operations further comprise setting the validity bit of the entry to be invalid based on the determination, by the branch prediction module, that the second instruction is a return instruction and applying such entry for a pipeline prediction.

19. The method of claim 16, wherein the prediction return address table further includes a branch identification value that is created based on an order in which the entries are added to the prediction return address table.

20. A computer program product comprising a computer readable storage medium having program instructions embodied therewith, the program instructions executable by one or more processors to cause the one or more processors to perform operations comprising:

receiving, by a branch prediction module, a first instruction;

based on a determination, by the branch prediction module, that the first instruction is a branch instruction and potentially a call, storing a return address associated with the branch instruction in a prediction return address table, wherein the prediction return address table includes an entry that corresponds to an index value that is created based on a target address of the first instruction, and wherein the entry includes the return address that is created based on an address of a sequential instruction of the first instruction and a validity bit that is set to valid upon a new entry being stored;

receiving, by the branch prediction module, a second instruction;

based on a determination, by the branch prediction module, that the second instruction is predicted to be a return instruction with a predicted return address table index value from the branch-target-buffer, using the index value to select the return address to predict as the target address.

* * * * *